(12) United States Patent
Schmidt

(10) Patent No.: US 10,875,020 B2
(45) Date of Patent: Dec. 29, 2020

(54) RECONFIGURABLE MICROVALVE OPTICAL WAVEGUIDE

(71) Applicant: The Regents of the University of California, Oakland, CA (US)

(72) Inventor: Holger Schmidt, Capitola, CA (US)

(73) Assignee: The Regents of the University of California, Oakland, CA (US)

( * ) Notice: Subject to any disclaimer, the term of this patent is extended or adjusted under 35 U.S.C. 154(b) by 491 days.

(21) Appl. No.: 15/756,860

(22) PCT Filed: Sep. 1, 2016

(86) PCT No.: PCT/US2016/049999
§ 371 (c)(1),
(2) Date: Mar. 1, 2018

(87) PCT Pub. No.: WO2017/040856
PCT Pub. Date: Mar. 9, 2017

(65) Prior Publication Data
US 2018/0243740 A1    Aug. 30, 2018

Related U.S. Application Data

(60) Provisional application No. 62/213,022, filed on Sep. 1, 2015.

(51) Int. Cl.
*G02B 6/35* (2006.01)
*B01L 3/00* (2006.01)
(Continued)

(52) U.S. Cl.
CPC .... *B01L 3/502738* (2013.01); *F16K 99/0011* (2013.01); *F16K 99/0015* (2013.01); *F16K 99/0034* (2013.01); *F16K 99/0059* (2013.01);

*G01N 15/1436* (2013.01); *G01N 15/1456* (2013.01); *G01N 15/1484* (2013.01); *G01N 21/05* (2013.01); *G02B 6/2804* (2013.01); *G02B 6/3536* (2013.01); *G02B 6/3538* (2013.01); *G02B 6/3574* (2013.01); *H01P 3/12* (2013.01); *B01L 2200/0668* (2013.01); *B01L 2300/0654* (2013.01); *B01L 2300/0816* (2013.01); *B01L 2300/123* (2013.01);
(Continued)

(58) Field of Classification Search
None
See application file for complete search history.

(56) References Cited

U.S. PATENT DOCUMENTS

2006/0171846 A1   8/2006  Marr et al.
2009/0165876 A1   7/2009  Atkin et al.
2014/0322489 A1  10/2014  Unger et al.

OTHER PUBLICATIONS

International Patent Application No. PCT/US2016/049999; Int'l Preliminary Report on Patentability; dated Mar. 15, 2018; 6 pages.
(Continued)

*Primary Examiner* — Chad H Smith
(74) *Attorney, Agent, or Firm* — BakerHostetler

(57) ABSTRACT

An optical waveguide comprises multiple layers of solid-state material disposed on a substrate. One of the layers is a lifting-gate valve made of a high refractive index material. The device provides for better optical confinement in microfluidic channels, and has the capability to integrate both optical signals and fluid sample processing. The optical paths on the chip are reconfigurable because of the use of a movable microvalve that guides light in one of its positions.

18 Claims, 12 Drawing Sheets

(51) Int. Cl.
G01N 21/05 (2006.01)
G01N 15/14 (2006.01)
H01P 3/12 (2006.01)
F16K 99/00 (2006.01)
G02B 6/28 (2006.01)
G01N 21/03 (2006.01)
G01N 21/64 (2006.01)
G02B 6/032 (2006.01)

(52) U.S. Cl.
CPC .......... *B01L 2400/0481* (2013.01); *B01L 2400/0655* (2013.01); *F16K 2099/0084* (2013.01); *G01N 2015/1454* (2013.01); *G01N 2021/0346* (2013.01); *G01N 2021/0364* (2013.01); *G01N 2021/6482* (2013.01); *G02B 2006/0325* (2013.01)

(56) References Cited

OTHER PUBLICATIONS

Kim et al.; "Universal Microfluidic Automaton for Autonomous Sample Processing: Application to the Mars Organic Analyzer"; Analytical Chemistry; vol. 85; 2013; p. 7682-7688.

Jensen et al.; "Digitally programmable microfluidic automaton for multiscale combinatorial mixing and sample processing"; Lab on a Chip; vol. 13; 2013; p. 288-296.

Kim et al.; "Lifting gate PDMS microvalves and pumps for microfluidic control"; Anal. Chem.; vol. 84(4); Feb. 2012; p. 2067-2071.

Jensen et al.; "A digital microfluidic platform for the automation quantitative biomolecular assays"; Lab Chip; vol. 10; 2010; p. 685-691.

Cuennet et al.; "Optofluidic-tunable color filters and spectroscopy based on liquid-crystal microflows"; Lab on a Chip; vol. 13, 2013; p. 2721-2726.

Erickson et al.; "Nanofluidic tuning of photonic crystal circuits"; Optics Letters; vol. 31 No. 1; Jan. 2006; p. 59-61.

Fan et al.; "Optofluidic Microsystems for chemical and biological analysis"; Nature Photonics; vol. 5; Oct. 2011; p. 591-597.

Groisman et al.; "Optofluidic 1×4 switch"; Optics Express; vol. 16 No. 18; Sep. 2008; p. 13499-13508.

Li et al.; "Optofluidic Distributed Feedback Dye Lasers"; IEEE Journal of Selected Topics in Quantum Electronics; vol. 13 No. 2; 2007; p. 185-193.

Mao et al.; "Tunable Liquid Gradient Refractive Index (L-GRIN) lens with two degrees of freedom"; Lab on a Chip; vol. 9; 2009; p. 2050-2058.

Monat et al.; "Integrated optofluidics: A new river of light"; Nature Photonics; vol. 1; Feb. 2007; p. 106-114.

Ozcelik et al.; "Dual-core optofluidic chip for independent particle detection and tunable spectral filtering"; Lab on a Chip; vol. 12; 2012; p. 3728-3733.

Ozcelik et al.; "Signal-to-Noise Enhancement in Optical Detection of Single Viruses with Multispot Excitation"; IEEE Journal of Selected Topics in Quantum Electronics; vol. 22 No. 4; 2016; 6 pages.

Parks et al.; "Hybrid optofluidic integration"; Lab on a Chip; vol. 13; 2013; p. 4118-4123.

Parks et al.; " Integration of programmable microfluidics and on-chip fluorescence detection for biosensing applications"; Biomicrofluidics; vol. 8; 2014; p. 054111-1 to 054111-8.

Schmidt et al.; "The photonic integration of non-solid media using optofluidics"; Nature Photonics; vol. 5; Oct. 2011; p. 598-604.

Schudel et al.; "Microfluidic chip for combinatorial mixing and screening of assays"; Lab on a Chip; vol. 9; 2009; p. 1676-1680.

Soldano et al.; "Optical Multi-Mode Interference Devices Based of Self-Imaging: Principles and Applications"; Journal of Lightwave Technology; vol. 13 No. 4; Apr. 1995; p. 615-627.

Song et al.; "Pneumatically Tunable optofluidic dye laser"; Applied Physics Letters; vol. 96; 2010; p. 081101-1 to 081101-3.

Song et al.; "Pneumatically Tunable optofluidic 2×2 switch for reconfigurable optical circuit"; Lab on a Chip; vol. 11; 2011; p. 2397-2402.

Tang et al.; "A Multi-color fast-switching microfluidic droplet dyer laser"; Lab on a Chip; vol. 9; 2009; p. 2767-2771.

Testa et al.; "A hybrid silicon-PDMS optofluidic platform for sensing applications"; Biomedical Optics Express; vol. 5 No. 2; Feb. 2014; p. 417-426.

Vollmer et al.; "Single virus detection from the reactive shift of a whispering-gallery mode"; PNAS; vol. 105 No. 52; Dec. 2008; p. 20701-20704.

Wolfe et al.; "Dynamic control of liquid-core/liquid-cladding optical waveguide"; PNAS; vol. 101 No. 34; Aug. 2004; p. 12434-12438.

Yang et al.; "Optical manipulation of nanoparticles and biomolecules in sub-wavelength slot waveguides"; Nature Letters; vol. 457; Jan. 2009; p. 71-75.

Abate et al.; "Single-layer membrane valves for elastomeric microfluidic devices"; Applied Physics Letters; vol. 92; 2008; p. 243509-1 to 243509-3.

Bakal et al.; "Tunable on chip optofluidic laser"; Applied Physics Letters; vol. 107; 2015; p. 211105-1 to 211105-3.

Bedoya et al.; "Reconfigurable photonic crystal waveguides created by selective liquid infiltration"; Optic Express; vol. 20 No. 10; May 2012; p. 11046-11056.

Bernini et al.; "Integrated optofluidic Mach-Zehnder interferometer based on liquid core waveguides"; Applied Physics Letter; vol. 93; 2008; p. 011106-1 to 011106-3.

Cai et al.; "A new fabrication method for all-PDMS waveguides"; Sensors and Actuators A: Physical; vol. 204; 2013; p. 44-47.

Cai et al.; "Optofluidic analysis system for amplification-free, direct detection of Ebola infection"; Scientific Reports; vol. 5; 2015; 8 pages.

Campbell et al.; "A microfluidic 2×2 optical switch"; Applied Physics Letters; vol. 82 No. 25; Dec. 2004; p. 6119-6121.

Chin et al.; "A reconfigurable optofluidic Michelson interferometer using tunable droplet grating"; Lab on a Chip; vol. 10; 2010; p. 1072-1078.

Ozcelik et al.; "Optofluidic wavelength division multiplexing for single-virus detection"; PNAS; vol. 112 No. 42; Oct. 2015; p. 12933-12937.

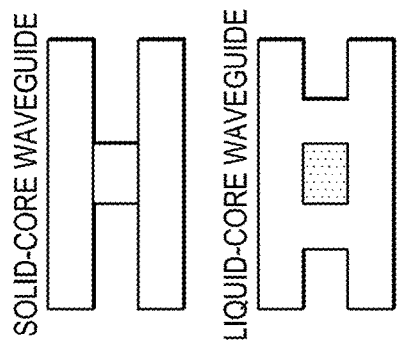
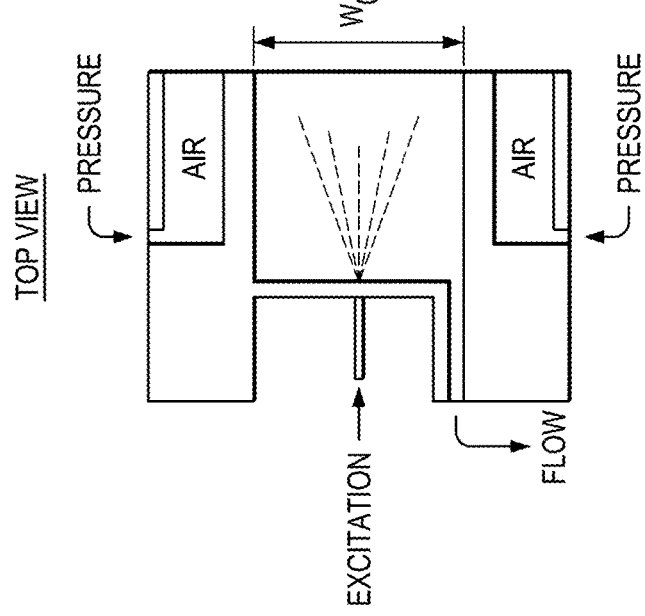
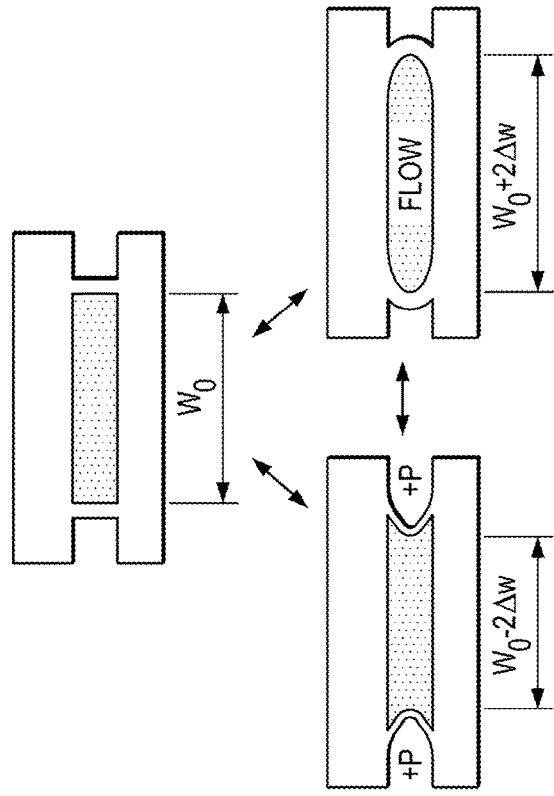
FIG. 5A
FIG. 5B

RECONFIGURABLE MICROVALVE OPTICAL WAVEGUIDE

CROSS REFERENCE

This application is a National Stage Application filed under 35 U.S.C. 371 of International Application No. PCT/US2016/049999, "Reconfigurable Microvalve Optical Waveguide," filed on Sep. 1, 2016, which claims the benefit under 35 U.S.C. 119(e) of U.S. Provisional Application No. 62/213,022, "Reconfigurable Microvalve Optical Waveguide," filed on Sep. 1, 2015, the contents of which are incorporated herein by reference in their entirety.

TECHNICAL FIELD

The present invention relates generally to the field of integrated optics, and more particularly to an optical waveguide comprising multiple layers of solid-state material disposed on a substrate, whereby one of the layers is a lifting-gate valve made of a high refractive index material.

BACKGROUND

Movable microvalves have been introduced for controlling liquids on microfluidic devices ("labs-on-chip"). One attractive implementation is the lifting-gate technology, e.g., a pneumatically actuated micro-valve. (See, e.g., [1] Jensen, E. C., Bhat, B. P., and Mathies, R. A., "A digital microfluidic platform for the automation of quantitative biomolecular assays", Lab Chip 10, 685-£91 (2010); [2] Kim, J., Kang, M., Jensen, E. C., and Mathies, R. A., "Lifting gate PDMS microvalves and pumps for microfluidic control", Anal. Chern. 84, 2067-2071 (2012); [3] Erik C. Jensen, E. C., Stockton, A., Chisel, T., Kim, J., and Mathies, R. A., "Digital Microfluidic automaton for multi-scale combinatorial mixing and sample processing", Lab Chip 13, 288-96 (2013); [4] Kim, J., Jensen, E., Stockton, A., and Mathies, R. A., "Universal Microfluidic Automaton for Autonomous Sample Processing: Application to the Mars Organic Analyzer", Anal. Chern. 85, 7682-88 (2013).) A lifting-gate valve is raised as vacuum is applied to the pneumatic channel on the top, allowing fluid motion through the channel below. Lifting-gate microvalves can be operated sequentially using computer control, thus creating devices with reconfigurable fluidic functions.

FIG. 1A illustrates the basic structure and operation of a lifting-gate microvalve 100. As shown, this is a three-layer device, comprising a substrate 110, a fluidic layer 120 made up of a channel 140 for the flow of a sample fluid and a flexible membrane with a tiny stub 120a (which acts a gate in the flow channel), and a pneumatic layer 130. The fluidic layer 120 is a made of a thin, flexible membrane, e.g. PDMS silicone. In addition, the pneumatic layer 130 includes a channel 150. When air is sucked from channel 150, the membrane of the fluidic layer 120 is pulled up as shown on the right side of FIG. 1A, which allows for fluids to flow in channel 140 as gate 120a is lifted up. FIG. 1B shows a prior art network of 1.3 microliter microvalves on a Polydimethylsiloxane (PDMS) chip.

A lifting-gate network (automaton) has recently been combined with dedicated optical sensing chips made on a silicon platform. The automaton was to implement advanced sample preparation steps, exemplified by the sequence-specific nucleic acid extraction protocol (See, e.g., Parks, J. W., Olson, M. A., Kim, J., Ozcelik, D., Cai, H., Carrion Jr., R., Patterson, J. L., Mathies, R. A., Hawkins, A. R., and Schmidt, H., "Integration of programmable microfluidics and on-chip fluorescence detection for biosensing applications". Biomicrofluidics 8, 054111 (2014).) As an example, synthetic nucleic acids corresponding to Zaire Ebola virus were mixed with matching molecular beacon probes, magnetic microbeads with another matching pull-down sequence, and other random DNA. After mixing and incubation in one of the microvalves, beads with multiple attached target-probe complexes were pulled to the valve bottom with a magnet, and remaining nucleic acids were washed off. Subsequently, the beads were pumped into a Si-based anti-resonant reflecting optical waveguide (ARROW) chip for detection.

SUMMARY

The present invention relates to an optical waveguide comprising multiple layers of solid-state material disposed on a substrate, wherein one of the layers is a lifting-gate valve made of a high refractive index material (i.e., the refractive index of the lifting-gate valve is higher than the refractive index of the surrounding material). The invention introduces concepts for directing and providing better optical signal confinement in microfluidic channels. Specifically, the invention introduces a microvalve optical waveguide device having the capability to integrate both optical signals and sample processing. For example, referring to the lifting-gate embodiment of FIG. 1A, with the present invention the gate 120a would be made of high refractive index material allowing light to be guided through the gate, or stub. In this case, the light would travel in the transverse direction (generally perpendicular to) the fluid flow, and when the gate is lifted up, the transmission of light would be effectively stopped, thus providing an off-on switch.

The present invention addresses the implementation of flexible optical layouts on microfluidic and optofluidic labs-on-chip. By designing a movable microvalve such that it can also guide, distribute, and collect light in different ways, we can dynamically change light paths on a chip. Current devices have fixed optical paths. The invention can be implemented with established microfluidic soft lithography techniques using, e.g., inexpensive polydimethylsiloxane (PDMS) silicon for rapid prototyping.

An illustrative embodiment of an optical waveguide in accordance with the present invention comprises a substrate characterized by a first refractive index, a pneumatic layer disposed on the substrate and characterized by a second refractive index, a channel between the substrate and the pneumatic layer and configured to receive a sample fluid, and a pneumatically actuated micro-valve comprising a gate. The gate is characterized by a third refractive index that is greater than the first refractive index and the second refractive index. An optical channel for guiding an optical signal is disposed between the substrate and the pneumatic layer transversely to the channel. The micro-valve is configured to be pneumatically actuated to switch from a first state in which the gate is positioned to block fluid flow in the channel, and a second state in which the gate is sufficiently withdrawn from the channel to permit fluid flow in the channel. Moreover, the high-index gate is configured for guiding the optical signal transversely through the channel when in the first state.

We also disclose a method for operating an optical waveguide. Other aspects of the inventive technology are described below.

BRIEF DESCRIPTION OF THE DRAWINGS

FIGS. 5A-5F relate to features of our inventive dynamically tunable multi-spot optofluidic waveguide.

FIG. 5A presents a schematic side-view of solid- and liquid-core waveguides.

FIG. 5B depicts a liquid-core MMI waveguide system from top (left) and side (right) views. In FIG. 5B, fiber injected laser light propagates through the excitation solid-core waveguide and into the liquid-core waveguide with a static width of w0. Air pressure yields a decrease in liquid-core waveguide width (bottom left, side view) while liquid flow increases waveguide width (bottom right, side view).

FIG. 5C depicts experimental (top) and simulated (bottom) multi-spot waveguide patterns for a 50 μm wide liquid-core waveguide.

FIG. 5D is a graph of MMI length vs. spot number for seven fabricated liquid-core waveguide widths, 50-200 μm, with a 25 μm increment.

FIG. 5E is a graph of dynamic tuning of optofluidic waveguides by varying the core refractive index, nc.

FIG. 5F is a graph of width based dynamic tuning of optofluidic waveguides, w0=50 and 100 μm for circles and squares. Positive pneumatic pressure points increase to the left, at 20, 40, and 60 PSI, while the liquid flow rate is 1 mL/min. Note that the theoretical predictions using eq. (1) are represented as solid curves/lines in FIGS. 5D, 5E, and 5F.

FIG. 6A is a schematic representation of the lightvalve architecture. Top-center—as fabricated lightvalve composed of three functional layers: layer I is the control layer; layer II is composed of a high refractive index waveguide core (dark grey) and a low refractive index mechanical membrane (light grey); layer III is the substrate layer. Top-left—lightvalve operated in push-down mode. Top-right-lightvalve operated in lift-up mode. The bottom row of images are respective counterparts to the upper row, rotated 90° about a vertical axis. Importantly, the control layer defines the lightvalve's width (wv) and length (Lv) as well as the maximum deflection of layer II via its height, hc.

FIG. 6B depicts lightvalve operation and respective effects on liquid and light flow. Note that light flow is tailorable/tunable in both lift-up and push-down modes (see FIGS. 6D and 6E).

FIG. 6C depicts optical switching of the lightvalve operated in lift-up (bottom) and push-down (middle). The top subplot is a schematic pressure trace designating the applied control pressure at any given time. The left-hand y-axis denotes the pressure applied during push-down operation while the right-hand y-axis denotes the pressures applied in lift-up mode.

FIG. 6D is a graph of optical switching efficiency of lightvalves operated in lift-up mode. The error-bars represent the standard deviation of 20 switching cycles.

FIG. 7A is a top-down schematic of the lightvalve trap with excitation laser light entering the trapping region from a solid-core waveguide, while signal is collected, filtered, and detected from the opposite waveguide facet. The observation volume is indicated in the center of the lightvalve trap by a Gaussian blurred bar and is distinctly smaller than the trap volume, which is characterized by the diameter (d) of the trap. Pressure is applied to the control layer, indicated here by dashed lines.

FIG. 7B is a graph of waveguide mode cross-sections, with the 1/e2 widths in the vertical ($h_{ex}$, =9.9 μm) and horizontal ($w_{ex}$=8.2 μm) directions, defining the optical interrogation region.

FIG. 7C is a graph of autocorrelation curves for different numbers of particles trapped inside a lightvalve, d=50 μm. Microscope images on the right represent snapshots of fluorescent particles within the excitation volume for each autocorrelation trace.

FIG. 7D is a graph of the fluorescence signal of trapped, single *E. coli* bacteria. Illustrations above the fluorescence trace indicate when the trap is closed, containing a cell (bacterium cartoon), and when the trap is cycling (open lightvalve cartoon).

DETAILED DESCRIPTION OF ILLUSTRATIVE EMBODIMENTS

Figure 1A:
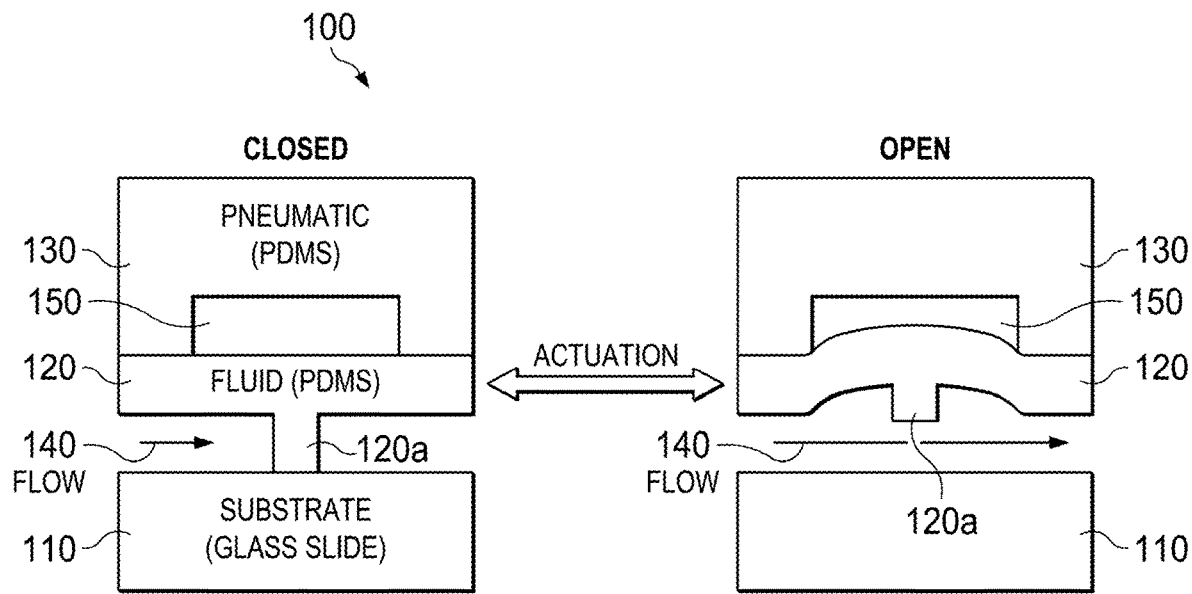
FIG. 1A shows a cross section of a prior art microfluidic lifting-gate valve.
Figure 1B:
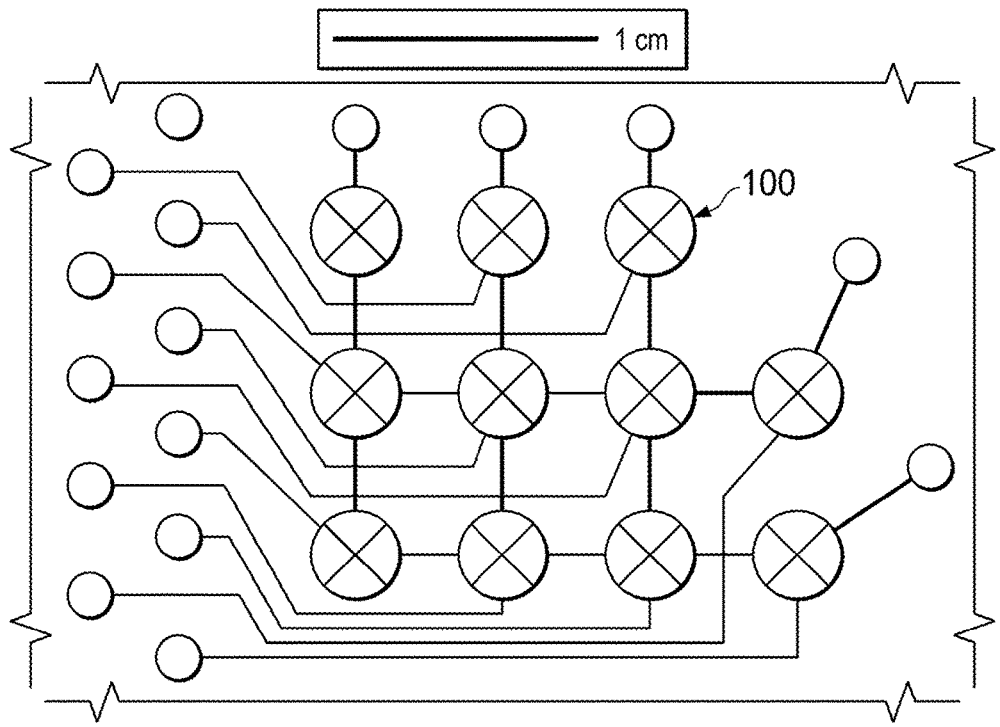
FIG. 1B shows a prior art network of 1.3 microliters microvalves on a Polydimethylsiloxane (PDMS) chip.
Figure 2A:
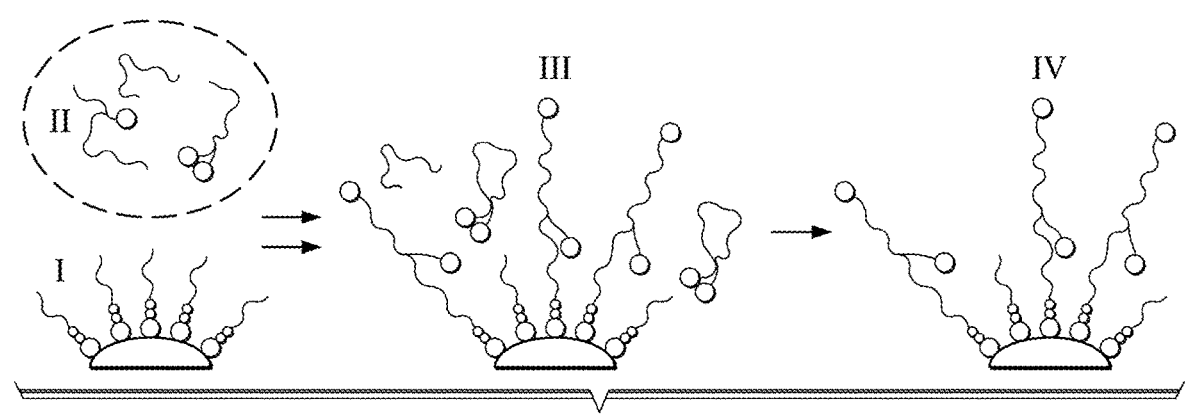
FIG. 2A shows a prior art sequence-specific nucleic acid extraction protocol.
Figure 2B:
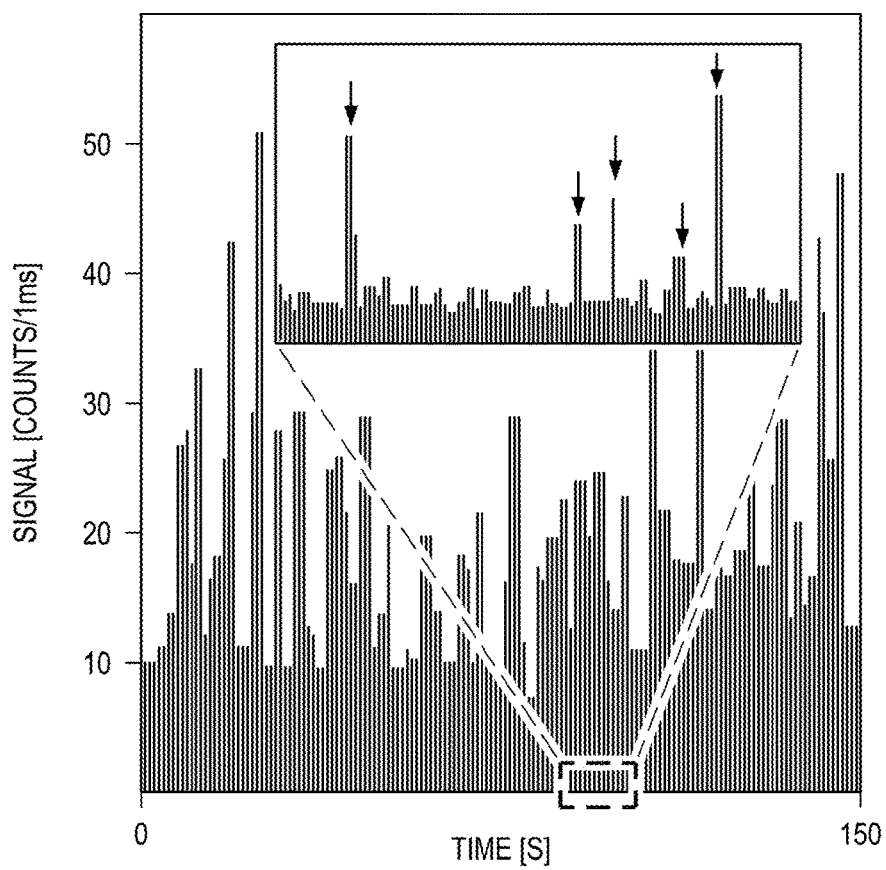
FIG. 2B shows a prior art fluorescence trace showing bursts of the extracted individual beads from FIG. 2A.
Figure 2C:
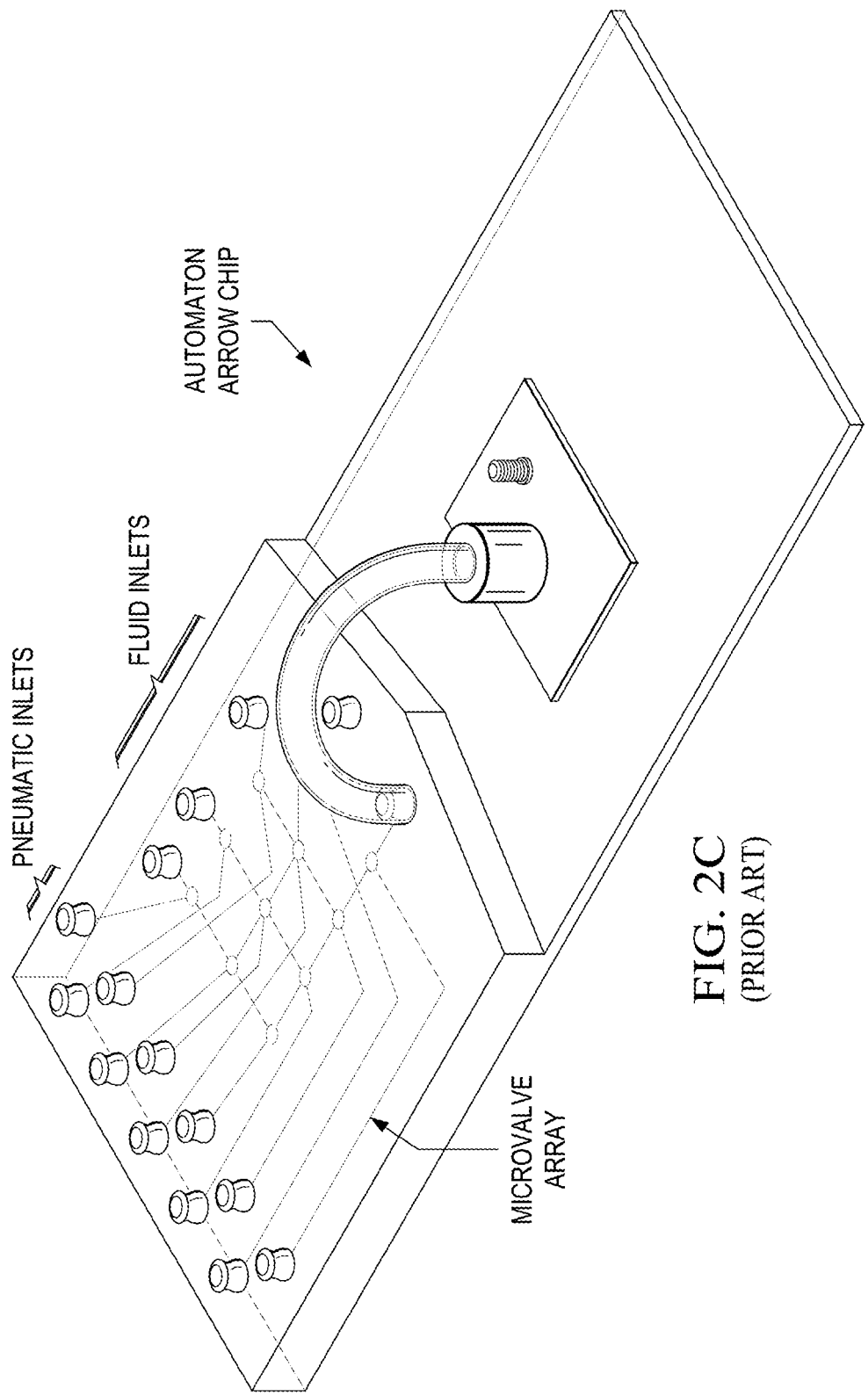
FIG. 2C shows a prior art optical waveguide device with two functional PDMS chips.

The present invention relates to the field of integrated optics, and more particularly to an optical waveguide comprising multiple layers of solid-state material disposed on a substrate, wherein one of the layers is a pneumatically actuated micro-valve (an example of which is a lifting-gate valve) made of a high refractive index material. The present invention introduces concepts for directing and providing better optical signal confinement in microfluidic channels. Specifically, the present invention introduces a single microvalve optical waveguide device that has the capability to integrate both optical signals and sample processing.

In the following subsections, we discuss our inventive methods for fabricating lifting-gate valves using high refractive index materials, and our inventive flexible optofluidic waveguide platform with multi-dimensional reconfigurability. The disclosed methods for fabricating lifting-gate valves are discussed with reference to FIGS. 1A-4D, while the disclosed flexible optofluidic waveguide platform is discussed with reference to FIGS. 5A-7D. Reference materials, denoted by footnotes, are listed at the end of the detailed description.

Fabricating Lifting-Gate Using a High Refractive Index Material

In one embodiment, improvement in the confinement of optical signals in an optical waveguide device includes the usage of a high refractive index material. The key material here is the high refractive index, which is strategically fabricated in a lifting-gate valve. This allows optical signals to be re-directed or re-distributed as signals flow through the channels of the optical waveguide. With more control of the signals that flow through the channels, the confinement of the signals in the channels is improved.

Fabrication of the lifting-gate valve may be achieved by bonding high and low-index layers together. Alternatively, spinning the low-index layer on top of the structured high-index layer would also provide for a dual layer of lifting-gate valves where light can be re-directed to a different layer in the optical waveguide. This refers to a lifting gate comprising a high and low index region, in which case one can implement the gate by making these two layers separately and bonding them with UV light or oxygen plasma (i.e., PDMS bonding), or by patterning the lower high index layer and then adding the second layer directly on top. This can be done by dropping the liquid precursor material on top and then spinning the whole thing rapidly. This creates a thin layer of uniform thickness, which can be controlled by spin duration and speed.

With high refraction index material fabricated in the lifting-gate valves, optical waveguides can be dropped into the channels of the device to create new light paths on the fly. These lifting-gate valves may be operated by the same pneumatic controls already used for the sample preparation valves.

Several embodiments are discussed below and with reference to the attached drawings. These descriptions and drawings are for explanatory purposes and do not exhaustively represent all combinations of waveguide configurations and mechanical assemblies provided by this invention. Those of ordinary skill in the art will readily appreciate that many other variations could be derived from these descriptions and the cited technical findings.

Figure 3A:
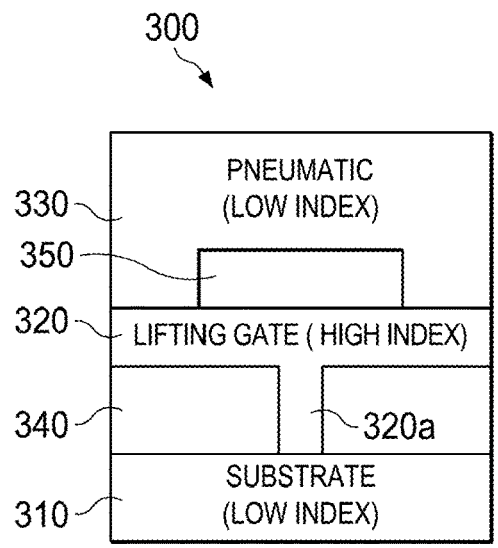
FIG. 3A shows a cross section of microfluidic single layer lifting-gate valve comprising high refractive index material.

An exemplary embodiment of the invention is represented in FIG. 3A, which depicts a cross-section of optical waveguide 300 where the microfluidic single layer lifting-gate valve 320 comprises a high refractive index material. As shown, the exemplary embodiment includes a substrate 310, fluidic layer 320, pneumatic layer 330, fluid channel 340, and pneumatic channel 350. It will be understood that light is lost in the liquid when gate 320a is up because the light won't be guided anymore. Therefore, this embodiment functions as both a fluidic valve and an optical on-off switch. The high index material of gate 320a enables light to be guided in the gate providing a closed optical path/bridge whenever the gate is down. (This is also illustrated in the bottom three figures of FIG. 6A, which are side views that illustrate the light guiding without pressure and when lifted up or pushed down.)

The optical waveguide 300 may be configured as an anti-resonant reflecting optical waveguide (ARROW) waveguide, slot waveguide, hollow-core photonic crystal fiber, omniguide, dual-hollow-core waveguide, or Bragg waveguide. Furthermore, the substrate 310 may comprise silicon, PDMS, or glass material. And the pneumatic and fluidic layers 330, 320 may comprise SiO2 and SiN or PDMS material. The lifting-gate valve 320 in FIG. 3A is fabricated of material with an index of refraction higher than the index of refraction of the substrate 310 and the surrounding layers.

Figure 3B:
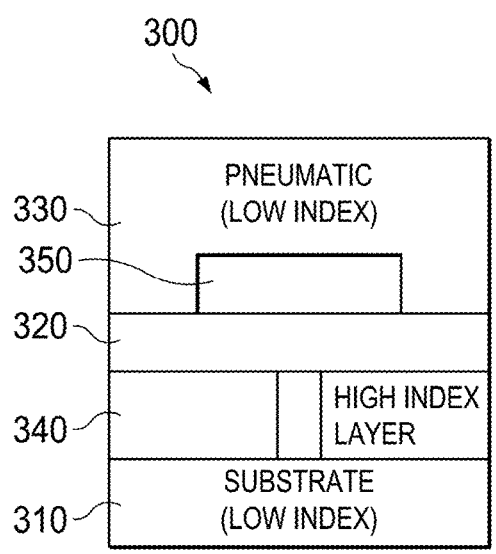
FIG. 3B shows a cross section of a microfluidic dual layer lifting-gate valve comprising a bond combining the high and low-index layer.

FIG. 3B depicts an illustration of a microfluidic dual layer lifting-gate valve comprising a bond that combines high and low-index layers 320, 330. In yet another embodiment (not depicted in the figures), the optical waveguide 300 may be configured by spinning the low-index layer 330 on top of the structured high index layer 320.

Figure 4A:
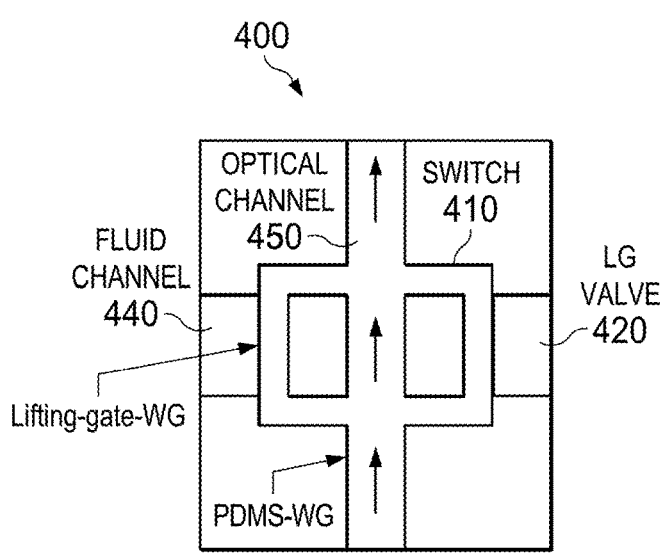
FIG. 4A shows an example embodiment of a reconfigurable microvalve waveguide with straight-through path ("on-off switch").

FIG. 4A depicts an illustration of the optical waveguide 400 with an on-off switch 410. While the optical waveguide 400 is in the on-state, light may cross the channel 440 after the lifting-gate valve 420 gate is lowered. In other embodiments, the channel 440 can either be empty (propagation through air is very lossy) or filled with (absorbing) liquid to increase the throughput contrast between the on and off states of the optical waveguide 400.

Figure 4B:
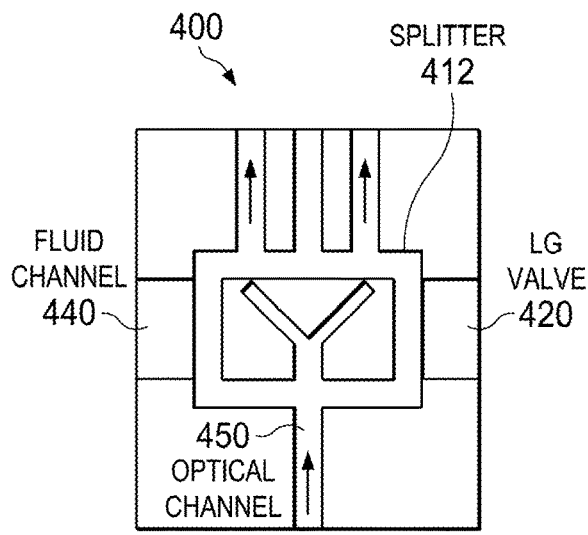
FIG. 4B shows an example embodiment of a reconfigurable microvalve waveguide using a Y-splitter to redistribute or redirect light to different channels.

FIG. 4B depicts an illustration of optical waveguide with the lifting-gate valve 420 that may be configured as a Y-splitter 412. By reconfiguring the optical waveguide 400 in such a way, the optical signals may be re-distributed or re-directed to different channels. That way the microvalves in the optical waveguide 400 can guide, distribute, and collect light in different ways, and the light paths can be dynamically changed on-the-fly on a chip.

Figure 4C:
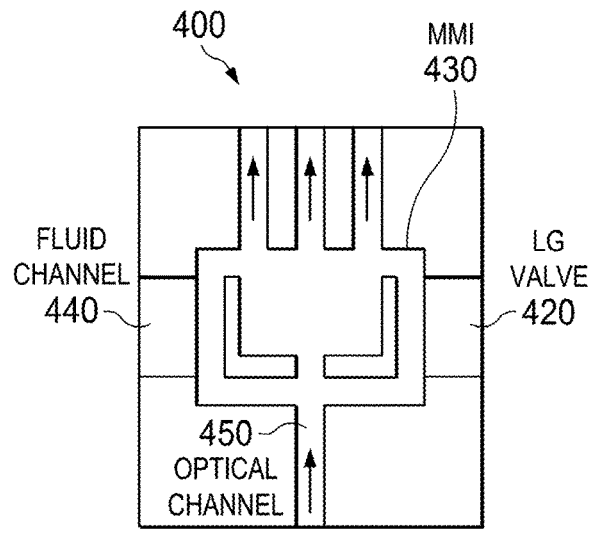
FIG. 4C shows an example embodiment of a reconfigurable microvalve waveguide using a multi-mode interferometer (MMI) to redistribute or redirect light to different channels.

FIG. 4C depicts an illustration of optical waveguide 400, in an alternate embodiment, with lifting-gate valve 420 configured as a multi-mode interferometer (MMI, 430) waveguide. Again, by reconfiguring the optical waveguide in such a way, the optical signals or light source may conveniently be re-distributed or re-directed to different channels. An MMI such as this supports multiple lateral and/or transverse waveguide modes, each with a different propagation constant. If these modes are excited simultaneously, they will interfere as they propagate along the MMI, creating well-defined images at well-defined MMI lengths. For example, when excited by a single-mode input waveguide, the MMI reproduces the input mode shape ("self-imaging") after a characteristic distance. Alternatively, a single spot can be split up into N equidistant spots at well-defined lengths, which can be used to distribute light into multiple channels or create multi-spot excitation patterns for fluorescence analysis. Other examples for the imaging properties of an MMI and its applications can be found in the literature.

Figure 4D:
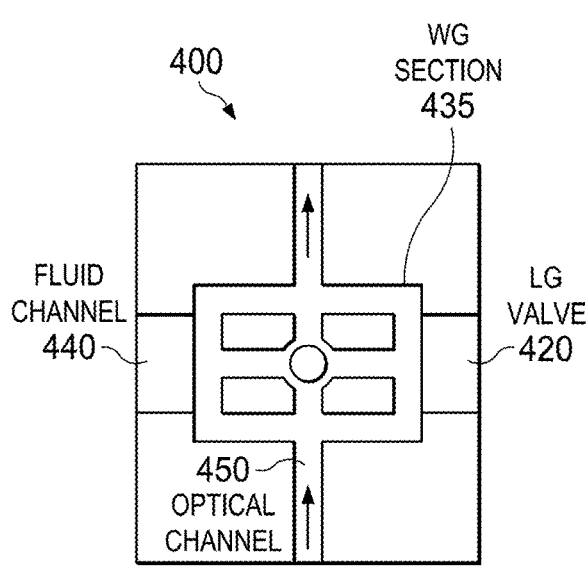
FIG. 4D shows an example embodiment of a reconfigurable microvalve waveguide trapping light.

FIG. 4D depicts an illustration of optical waveguide 400 where particles may be physically confined (trapped) along the fluidic channel 440 by using a lifting-gate valve that forms a (topologically) ring-shaped enclosure. Particles held in this enclosure can be optically interrogated (optical signals excited and/or collected) using straight waveguide sections 435. For example, fluorescence light or another form of optical signal can be generated and/or captured along the fluidic channel 440 using a straight waveguide section.

Flexible Optofluidic Waveguide Platform with Multi-Dimensional Reconfigrrability We will now discuss our new optofluidic platform that provides both multi-modal photonic reconfiguration and advanced fluidic sample handling in a single chip. On-chip photonic devices are based on a combination of solid-core and liquid-core PDMS waveguides as shown in FIG. 5A. The waveguides can be built with established multilayer soft lithography techniques and seamlessly connect with each other to form a wide variety of photonic layouts. Moreover, the layer structure is compatible with incorporation of fluidic microvalves to enable both optical tuning and fluid control in a single device. Specifically, the index-guiding solid-core waveguides are formed by controlling the PDMS precursor ratio[25] in different layers to create a high-index waveguide core (for more details see the supplementary information). Unlike previous implementations of PDMS waveguides, our cores (in the illustrative embodiments) are only ~7×8 µm in cross section (unless otherwise noted), providing excellent mode matching to single-mode fiber, thus allowing for advanced photonic devices such as interferometers that rely on careful control over one or a few waveguide modes. Liquid-core sections are either filled with high-index liquid to enable index-guiding or kept short to minimize optical losses in low-index leaky mode operation.

In order to demonstrate the physical implementation of the PDMS waveguide platform and the ability to tune an optical device using both fluid control and pressure, we first consider a multi-mode interference (MMI) waveguide.[26] MMIs create length and wavelength dependent spot patterns upon propagation of multiple waveguide modes, and have recently been used to implement spectrally multiplexed detection of single viruses flowing through intersecting fluidic channels.[21] Our liquid-core optofluidic MMI is schematically shown in FIG. 5B and is designed for active tuning by varying both pressure and core fluid. A 5 µm wide and 7 µm tall solid-core waveguide is used as an input for the wide liquid-core MMI section (width $w_0$, length L). The MMI is surrounded laterally by 50 µm wide air channels, which enable both optical waveguiding and tuning of the MMI width through pneumatic and fluidic pressure, as is illustrated in the right side of FIG. 5B.

The multimode interference leads to the formation of N images of the input mode for a given length, L, and pressure, P, according to $$N(L, P) = \frac{n_c w(F)^2}{\lambda} \cdot \frac{1}{L}. \quad (1)$$

Figure 5C:
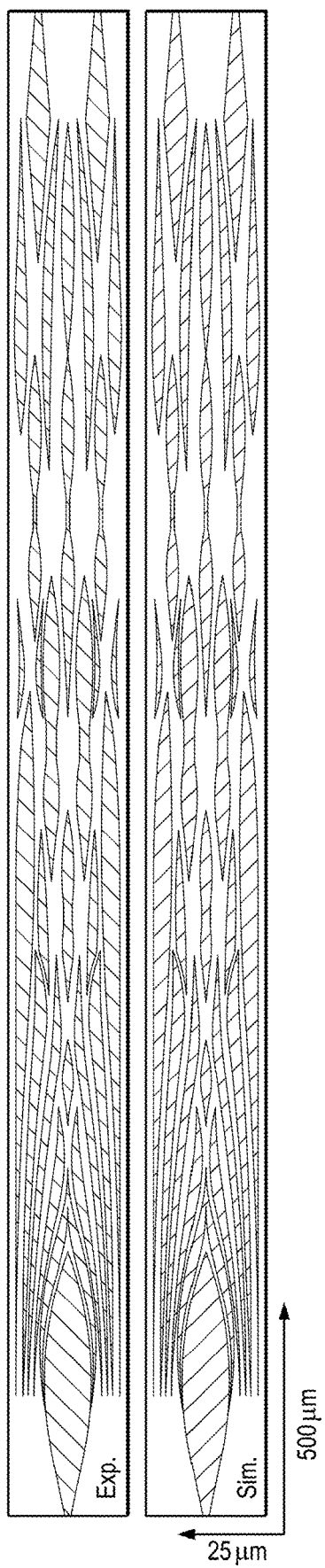
Figure 5D:
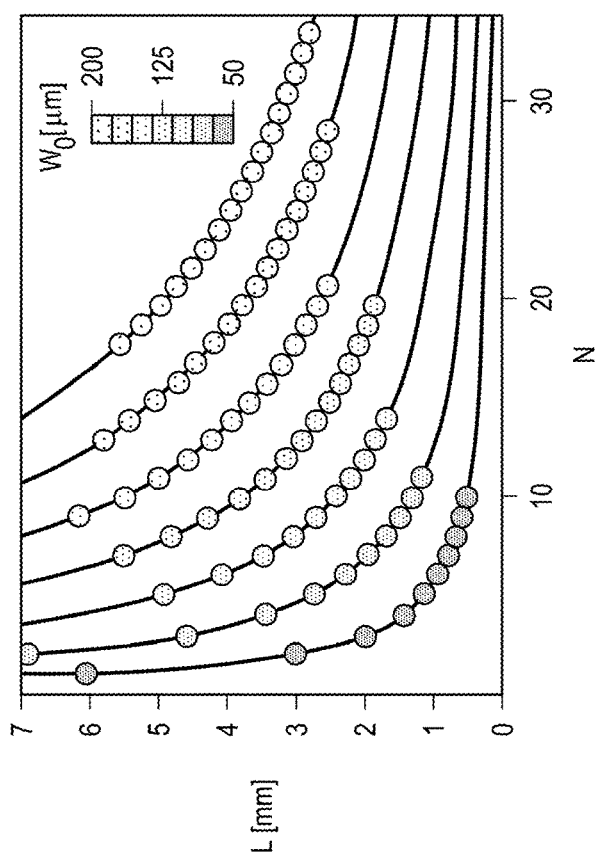

This pattern formation is visualized in FIG. 5C (top) for a static MMI (P=0; $w_0$=50 µm) filled with fluorescent dye in ethylene glycol ($n_c$=1.45) and excited with $\lambda$=532 nm laser light. Clean spot patterns are observed over a distance of several millimeters in excellent agreement with eqn. (1) and finite difference method simulations shown in FIG. 5C (bottom). Liquid-core MMIs with widths between 50 and 200 µm (25 µm increment) were fabricated and characterized as presented in FIG. 5D. We were able to controllably vary the spot number from 1 to 34 images with device lengths less than 1 cm, all in excellent agreement with theory (lines). Such MMIs, therefore, provide a wide parameter space for multi-spot particle detection with high signal-to-noise ratio.[21,27]

Figure 5E:
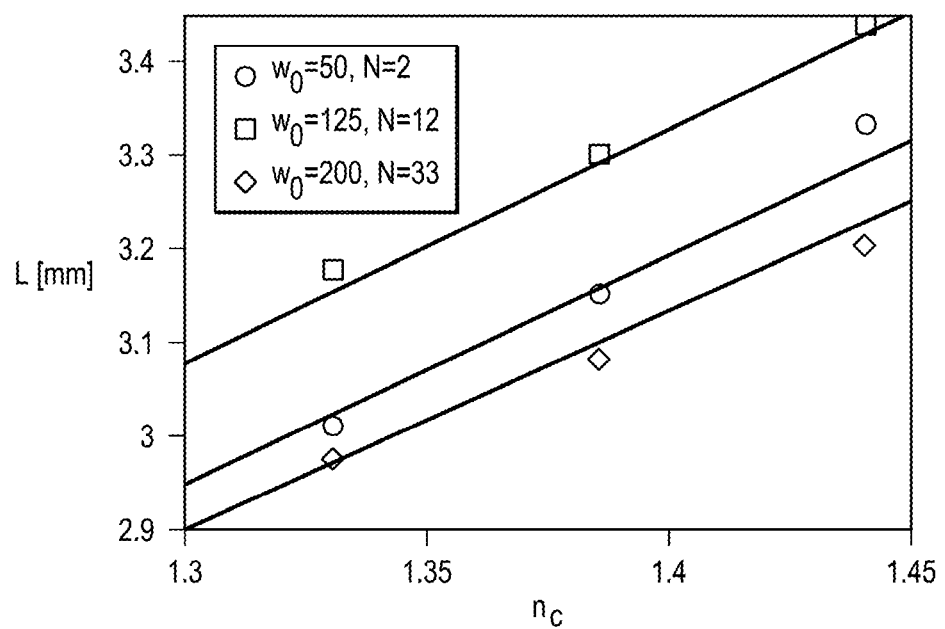

Next, we turn to dynamic tuning of these optofluidic elements. The first mechanism is through replacement of guiding liquid, i.e the waveguide core refractive index, $n_c$. FIG. 5E shows MMI tuning using different mixtures of ethylene glycol and water. Specifically, a sampling of waveguides (with various widths, $w_0$, and spot numbers, N) were used to demonstrate the linear relationship between core refractive index, $n_c$, and image length, L. Tuning of the spot number over a very wide range from 2 to 33 was realized, and excellent agreement between theoretical and experimental results was found.

Figure 5F:
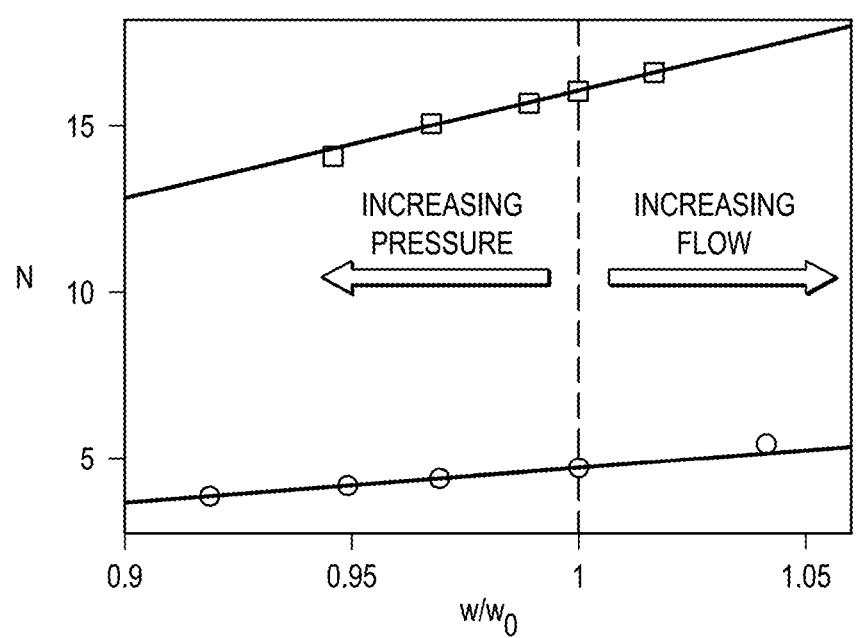

Thin sidewalls made from a pliable material (PDMS) allow for controlling a microfluidic channel's width through both inward and outward pressure.[28] Here, we use this principle for pressure-based dynamic tuning of the optofluidic MMI devices. Inward pneumatic pressure applied to the side channels causes a decrease in the MMI width, (FIG. 5B, right) and thus, a decreased spot number, N, at a given length, L. Conversely, positive fluidic pressure in the core increases both w and N as seen in FIGS. 5B and 5F. Note that all data points in FIG. 5F are at a given length L that yields an integer spot number at zero applied pressure. The data closely matches theoretical expectations (lines in FIG. 5F).

Figures 6A, 6B:
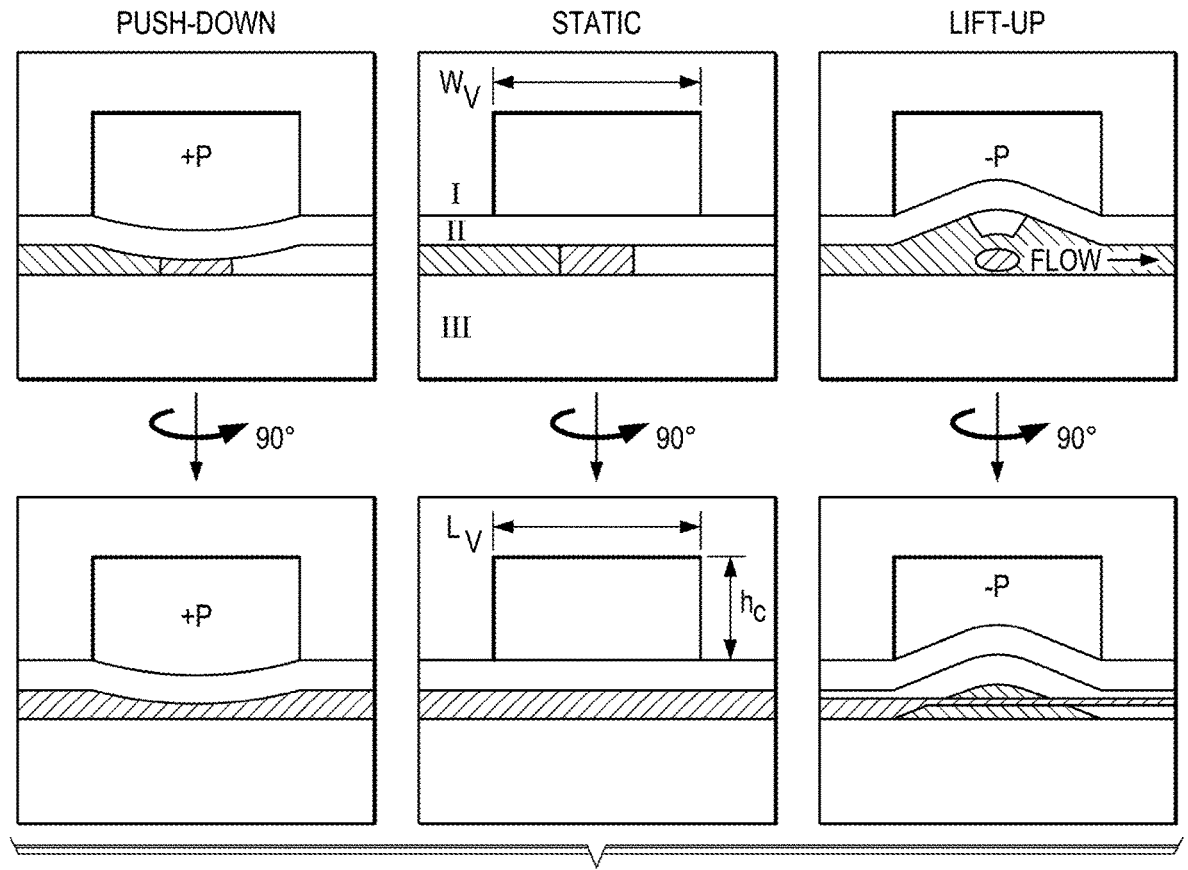
FIGS. 6A-6D illustrate features of our lightvalve design, function, and operation.

We now turn to introducing a new approach for a fully—optically and fluidically—reconfigurable optofluidic platform. At its heart is an actuatable microvalve that simultaneously acts as an optical waveguide and actively moderates fluid flow, dubbed here as a "lightvalve". Our implementation is based on lifting-gate microvalves that have been used in microfluidic devices for complex bioassays.[29,30] FIG. 6A shows the schematic design of the lightvalve, with the middle images showing its static architecture in cross-section and side view. It is composed of three PDMS layers, a control layer (I), a waveguide valve layer (II), and a substrate (III). The control layer, I, is designed to allow for both push-down (positive pressure, FIG. 6A, left) and lift-up (negative pressure, FIG. 6A, right) operation. By varying the pressure, different combinations of photonic and fluidic functions of the lightvalve can be implemented as shown in the table of FIG. 6B. Without pressure, light is guided across the fluid valve (green arrow) while liquid flow is blocked (cross). Alternatively, positive pressure also blocks liquid flow while enabling dynamic tuning of optical transmission by varying the pressure. Finally, negative pressure results in fluid flow with tailorable optical rejection. The lightvalve can be constructed with established lifting gate valve fabrication processes, plus the addition of the waveguide core segment in layer II (dark grey) which is formed through a single added spin step of high refractive index PDMS (see Supplemental Information).

Figure 6C:
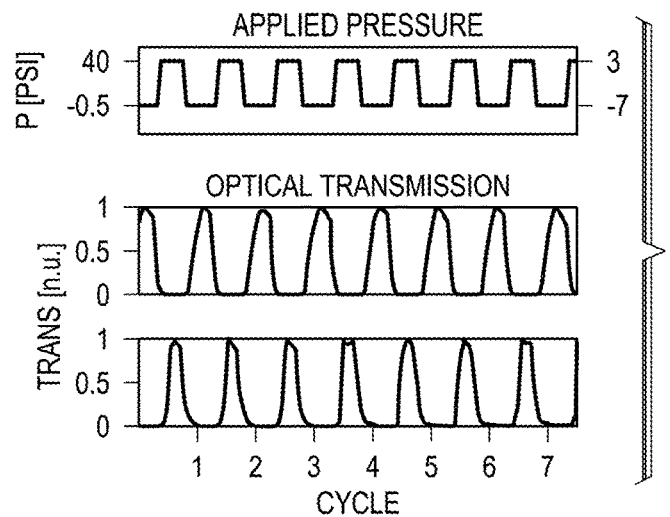

The obvious Litmus test for photonic functionality of the lightvalve is operation as an on-off switch, which is reported in FIG. 6C for a 0.6 mm long valve. The top trace shows the temporal pressure sequence for the valve and the two bottom traces show the optical transmission across the valve in push-down (middle, red) and lift-up (bottom, blue) modes. Successful and repeatable switching with excellent extinction is observed for both pressure modes. Cycle rates can reach ~100 Hz and are limited by the microfluidic control system. The switches operated without degradation for over 100,000 switching cycles in both modes.

Figure 6D:
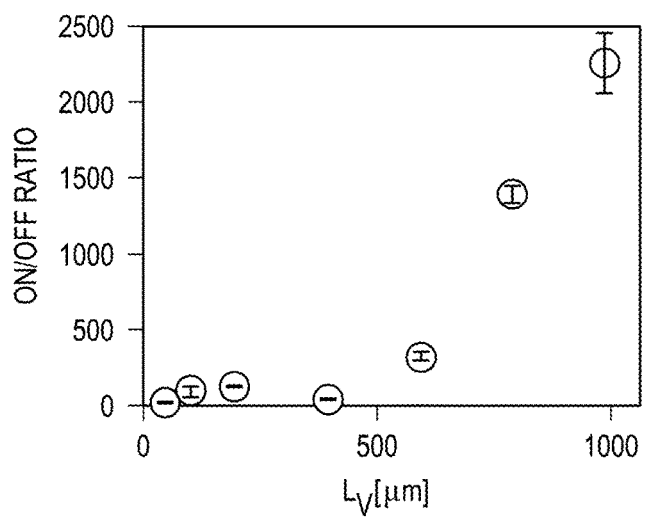
Figure 6E:
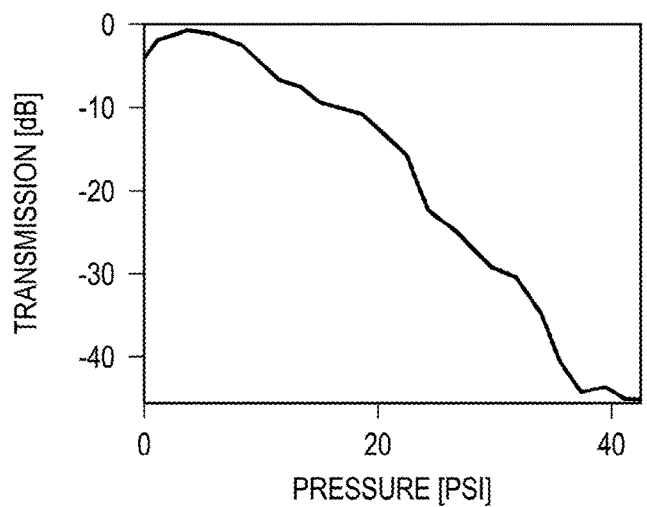
FIG. 6E is a graph of optical rejection of the lightvalve operated at various push-down pressures.

Next, we analyzed the on-off optical switching efficiency for different length lightvalves operated in lift-up mode. The results are displayed in FIG. 6D and show a steep increase in performance at around 500 µm length (with control height, $h_c$=100 µm). This is due the fact that optical switching in lift-up operation relies on bending of the entire membrane formed by layer II; as such, when the effected membrane bend is small, optical rejection is low. FIG. 6D shows that the lightvalve switches off for length/height ($L_v/h_c$) ratios above 5 and the on-off ratio continues to improve up to $L_v/h_c$~10. At even longer lengths, on-off ratios become inconsistent due to membrane deformations during actuation.

Push-down operation, on the other hand, is relatively length-independent as it relies only on deformation of the waveguide structure at the beginning of the lightvalve, which leads to poor mode coupling between the excitation and valve waveguides. FIG. 6D shows that the on-off ratio depends on the applied pressure for a short valve length, $L_v$=300 µm. After first reaching a maximum at 3 psi due to optimized optical mode coupling, the transmission drops dramatically, resulting in an on-off ratio of ~45 dB at 40 psi, indicating excellent light blocking capability over short valve lengths length.

Figure 7A:
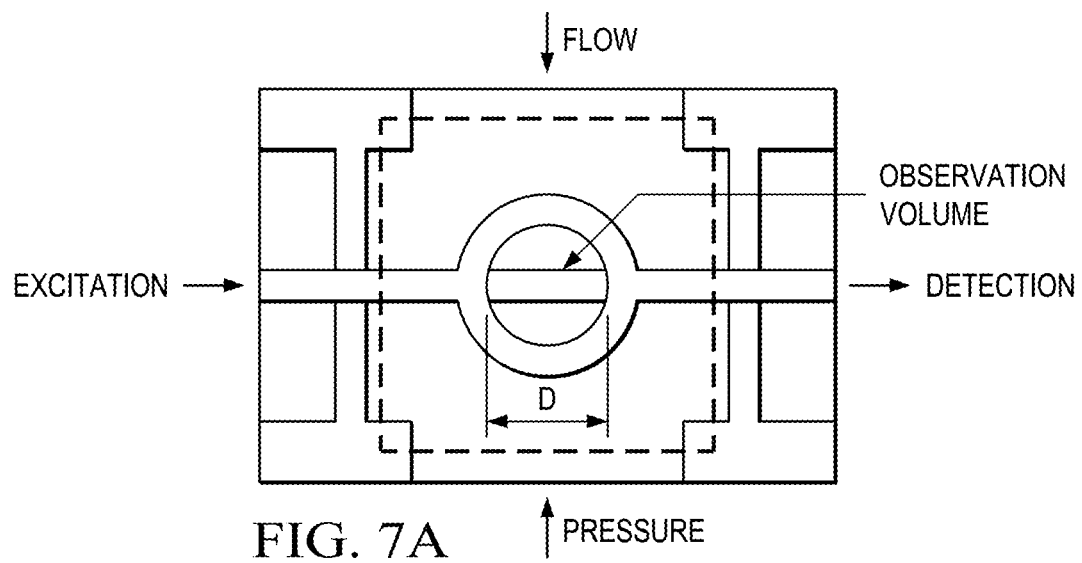
FIGS. 7A-7D illustrate features of a lightvalve particle trap.
Figure 7B:
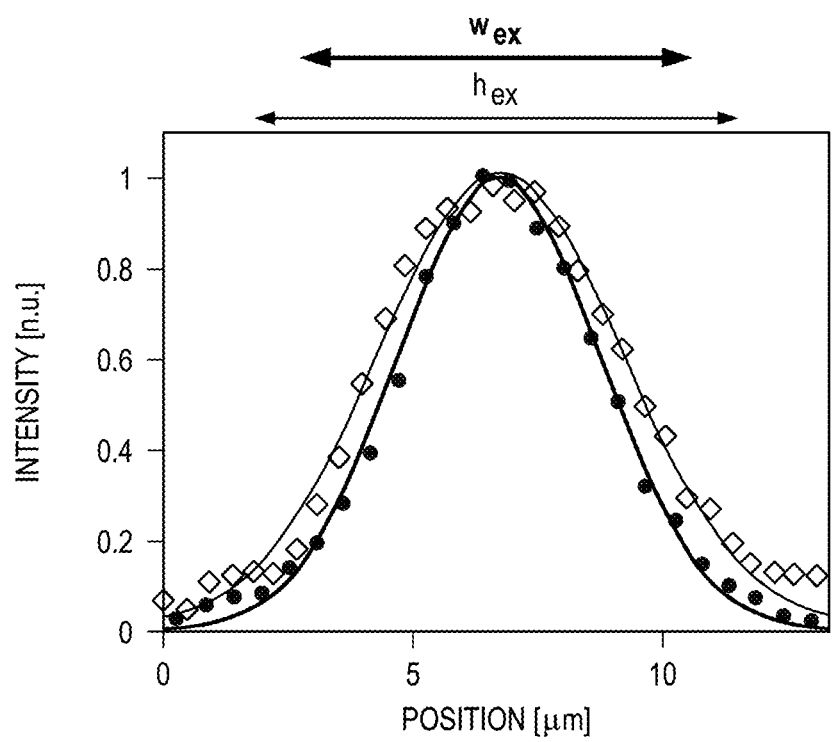
Figure 7C:
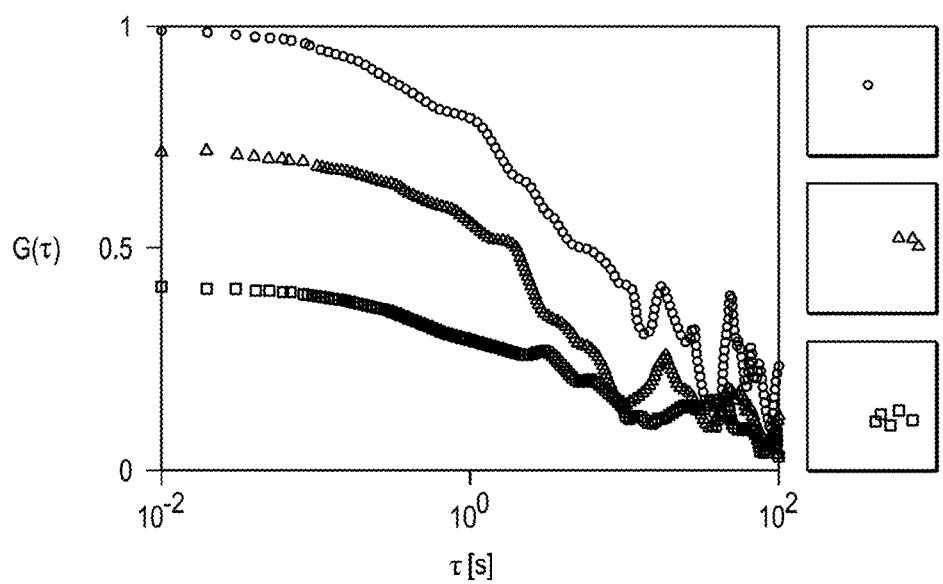

Finally, we demonstrate an implementation of the lightvalve as a functional element that unites both fluid handling and photonic functions of a bio-detection assay. To this end, the lightvalve is built as an annular structure shown schematically in FIG. 7A. Fluidically, the lightvalves can be used to mechanically trap objects within the annulus when lowered into the channel. We fabricated annuli with 5-80 µm diameters, enclosing volumes between 140 fL and 35 pL. The lightvalves also act as peristaltic pumps for refreshing fluid within the traps by connecting three or more valves in series and actuating them sequentially in lift-up mode. Optically, the annulus enables in-plane optical interrogation of trapped particles using light that traverses the valve ring along the straight waveguide path. The optical path shown in FIG. 7A defines the optical excitation and collection volume of the trap. The solid-core waveguides are narrow enough to create effectively single vertical and lateral optical modes as shown in FIG. 7B. This allows for implementing advanced optical spectroscopy methods on small numbers of particles trapped inside the annulus. We illustrate this capability using fluorescence correlation spectroscopy (FCS). FIG. 7C left shows top-down camera images of 3, 5, and 10 trapped, fluorescent microbeads (note that only beads within the excitation volume are fluorescing in the image). The corresponding FCS traces—acquired by in-plane fluorescence detection along the solid-core PDMS waveguides—are shown on the right. When the ratio of physical trap volume and optical excitation volume $V_{exc}$ is taken into account, the particle concentration c obtained from the FCS curves ($c=G(0)/V_{exc}$) agrees well with the value obtained by camera observation.

Figure 7D:
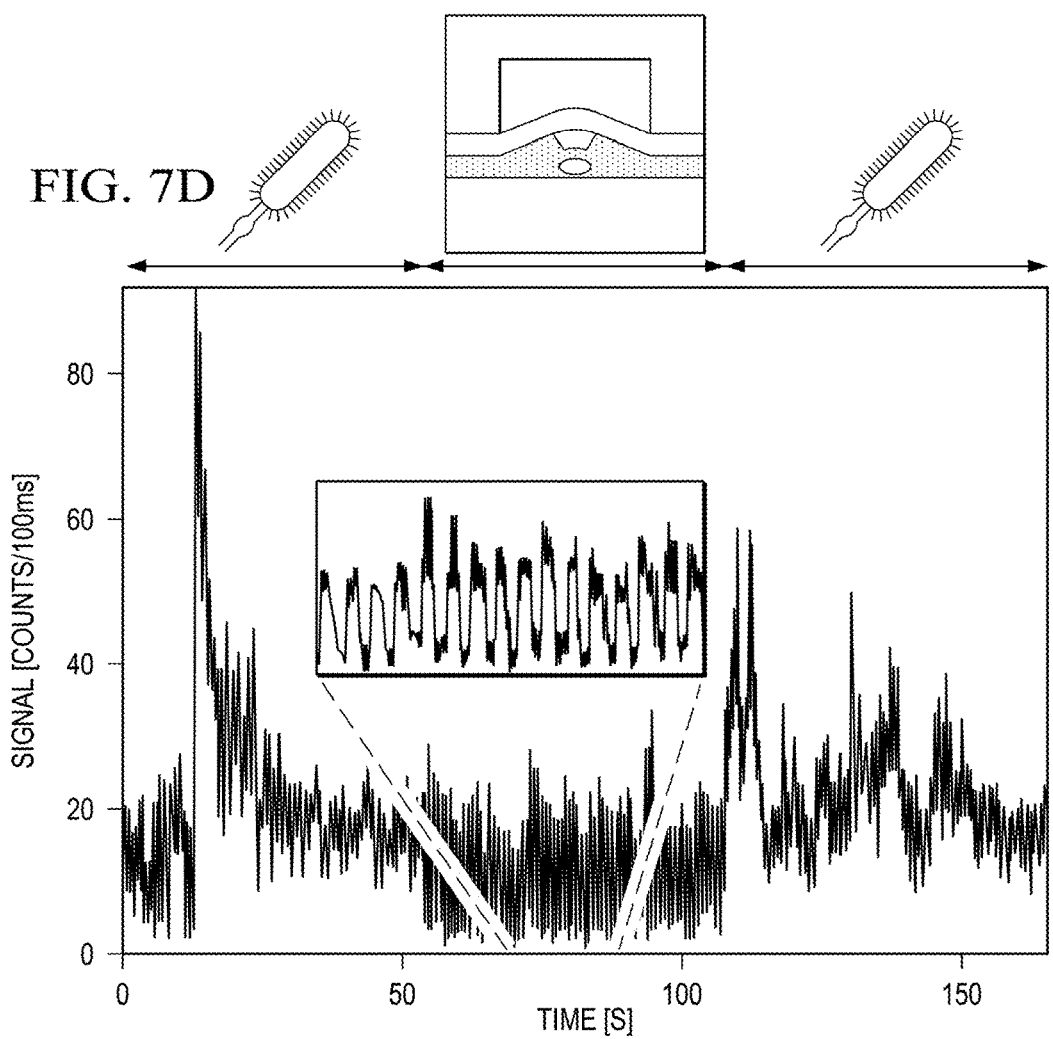

Lastly, we demonstrate the lightvalve trap's ability to analyze single, trapped bioparticles—here, fluorescently stained *E. coli* bacteria. FIG. 7D shows the time-dependent fluorescence signal collected from the trap. An initially empty trap is closed at t~15 sec and a single *E. coli* bacterium is trapped within the observation volume. The detected fluorescence decreases continuously over the bacterium's 40 second residence within the trap due to photobleaching. After 55 seconds, the bacterium is released by activating the lift-up function, followed by a series of actuations (i.e. fluid pumping) in search of another bacterium. The inset of FIG. 7D shows high signal when the trap is up, and low signal when trap is down. After 110 seconds, the trap is locked down again because a bacterium is detected above the background optical signal threshold. Subsequently, this bacterium is diffusing in and out of the observation volume, yielding a fluctuating fluorescence signal. We note that FCS analysis of the two bacteria trapped herein yield diffusion coefficients of ~0.5 $\mu m^2/s$ as expected for a particle of ~1 µm diameter.

In summary, we have introduced a new optofluidic platform that seamlessly marries optical and fluidic functions in a single chip. Based on combining solid- and liquid-core PDMS waveguides whose fabrication is compatible with purely microfluidic chips, we created devices that offer multi-modal photonic reconfigurability using core liquids, mechanical pressure and motion. The potential of this approach was illustrated using widely tunable liquid-core MMI waveguides and by the introduction of novel lightvalves that regulate both liquid and light flow. Extremely efficient optical switching and definition of physical particle traps for optical analysis were demonstrated. The fluidic valve shape and optical pathways created by the lightvalve can be designed independently and with great flexibility, making the lightvalve a powerful building block for future optofluidic devices.

While preferred embodiments have been shown and described, various modifications and substitutions may be made thereto without departing from the spirit and scope of the invention. Accordingly, it is to be understood that the present invention has been described by way of illustration and not limitation.

REFERENCES

1. Monat, C., Domachuk, P. & Eggleton, B. J. Integrated optofluidics: A new river of light. *Nat. Photonics* 1, 106-114 (2007).
2. Schmidt, H. & Hawkins, A. R. The photonic integration of non-solid media using optofluidics. *Nat. Photonics* 5, 598-604 (2011).
3. Li, Z. & Psaltis, D. Optofluidic Distributed Feedback Dye Lasers. *IEEE J. Sel. Top. Quantum Electron.* 13, 185-193 (2007).
4. Tang, S. K. Y. et al. A multi-color fast-switching microfluidic droplet dye laser. *Lab Chip* 9, 2767 (2009).
5. Song, W. & Psaltis, D. Pneumatically tunable optofluidic dye laser. *Appl. Phys. Lett.* 96, 3-5 (2010).
6. Bakal, A., Vannahme, C., Kristensen, A., & Levy, U. Tunable on chip optofluidic laser, *Appl. Phys. Lett.* 107, 211105 (2015);
7. Erickson, D., Rockwood, T., Emery, T., Scherer, A. & Psaltis, D. Nanofluidic tuning of photonic crystal circuits. *Opt. Lett.* 31, 59-61 (2006).
8. Bedoya, A. C. et al. Reconfigurable photonic crystal waveguides created by selective liquid infiltration. *Opt. Express* 20, 11046-11056 (2012).
9. Cuennet, J. G., Vasdekis, A. E. & Psaltis, D. Optofluidic-tunable color filters and spectroscopy based on liquid-crystal microflows. *Lab Chip* 13, 2721-6 (2013).
10. Ozcelik, D. et al. Dual-core optofluidic chip for independent particle detection and tunable spectral filtering. *Lab Chip* 12, 3728-33 (2012).
11. Mao, X., Lin, S. S., Lapsley, M. I., Shi, J., Juluri, B. K. & Huang, T. J. Tunable Liquid Gradient Refractive Index (L-GRIN) lens with two degrees of freedom, *Lab Chip* 9, 2050-2058 (2009).
12. Bernini, R., Testa, G., Zeni, L. & Sarro, P. M. Integrated optofluidic Mach-Zehnder interferometer based on liquid core waveguides. *Appl. Phys. Lett.* 93, 011106(2008).
13. Chin, L. K., Liu, A. Q., Soh, Y. C., Lim, C. S. & Lin, C. L. A reconfigurable optofluidic Michelson interferometer using tunable droplet grating. *Lab Chip* 10, 1072-1078 (2010).
14. Wolfe, D. B. et al. Dynamic control of liquid-core/liquid-cladding optical waveguides. *Proc. Natl. Acad. Sci. U.S.A* 101, 12434-8 (2004).
15. Campbell, K. et al. A microfluidic 2×2 optical switch. *Appl. Phys. Lett.* 85, 6119-6121 (2004).
16. Groisman, A. et al. Optofluidic 1×4 switch. *Opt. Express* 16, 13499-13508 (2008).
17. Song, W. & Psaltis, D. Pneumatically tunable optofluidic 2×2 switch for reconfigurable optical circuit. *Lab Chip* 11, 2397-2402 (2011).
18. Fan, X. & White, I. M. Optofluidic microsystems for chemical and biological analysis. *Nat. Photonics* 5, 591-597 (2011).
19. Yang, A. H. J. et al. Optical manipulation of nanoparticles and biomolecules in sub-wavelength slot waveguides. *Nature* 457, 71-75 (2009).

20. Cai, H. et al. Optofluidic analysis system for amplification-free, direct detection of Ebola infection. *Sci. Rep.* 5, 14494 (2015).
21. Ozcelik, D. et al. Optofluidic wavelength division multiplexing for single-virus detection. *Proc. Natl. Acad. Sci.* 112, 12933-12937 (2015).
22. Vollmer, F., Arnold, S. & Keng, D. Single virus detection from the reactive shift of a whispering-gallery mode. *Proc. Natl. Acad. Sci. U.S.A* 105, 20701-4 (2008).
23. Parks, J. W. et al. Hybrid optofluidic integration. *Lab Chip* 13, 4118-4123 (2013).
24. Testa, G., Persichetti, G., Sarro, P. M. & Bernini, R. A hybrid silicon-PDMS optofluidic platform for sensing applications. *Biomed. Opt. Express* 5, 417-26 (2014).
25. Cai, Z., Qiu, W., Shao, G. & Wang, W. A new fabrication method for all-PDMS waveguides. *Sensors Actuators A Phys.* 204, 44-47 (2013).
26. Soldano, L. B. & Pennings, E. C. M. Optical multi-mode interference devices based on self-imaging: principles and applications. *J. Light. Technol.* 13, 615-627 (1995).
27. Ozcelik, D., et al. Signal-to-noise enhancement in optical detection of single viruses with multi-spot excitation", *IEEE J. Sel. Top. Quant. Elec.* 22, 4402406 (2016).
28. Abate, A. R. & Weitz, D. A. Single-layer membrane valves for elastomeric microfluidic devices. *Appl. Phys. Lett.* 92, 243509 (2008).
29. Schudel, B. R., Choi, C. J., Cunningham, B. T. & Kenis, P. J. A. Microfluidic chip for combinatorial mixing and screening of assays. *Lab Chip* 9, 1676-80 (2009).
30. Kim, J., Kang, M., Jensen, E. C. & Mathies, R. A. Lifting gate polydimethylsiloxane microvalves and pumps for microfluidic control. *Anal. Chem.* 84, 2067-71 (2012).

I claim:

1. An optical waveguide (300), comprising:
a substrate (310) characterized by a first refractive index;
a pneumatic layer (330) disposed on the substrate and characterized by a second refractive index;
a channel (340) between the substrate and the pneumatic layer and configured to receive a sample fluid;
a pneumatically actuated micro-valve (320) comprising a gate (320*a*) characterized by a third refractive index, wherein the third refractive index is greater than the first refractive index and the second refractive index; and
an optical channel (450) configured to guide an optical signal between the substrate and the pneumatic layer transversely to the channel;
wherein the micro-valve is configured to be pneumatically actuated to switch from a first state in which the gate is positioned to block fluid flow in the channel, and a second state in which the gate is sufficiently withdrawn from the channel to permit fluid flow in the channel; and
wherein the gate is configured for guiding the optical signal transversely through the channel when in the first state.

2. The optical waveguide of claim 1, wherein the substrate comprises at least one of silicon, polydimethylsiloxane (PDMS), or glass.

3. The optical waveguide of claim 1, wherein the pneumatic layer comprises at least one of SiO2, SiN, or polydimethylsiloxane (PDMS).

4. The optical waveguide of claim 1, wherein the optical waveguide is configured to actuate the micro-valve to function as an on-off switch (410).

5. The optical waveguide of claim 1, wherein the optical waveguide is configured to actuate the micro-valve to function as an optical signal splitter (412).

6. The optical waveguide of claim 1, wherein the optical waveguide is configured to actuate the micro-valve to function as a multi-mode interferometer (MMI, 430).

7. The optical waveguide of claim 1, wherein the optical waveguide is configured to function as a physical trap (435) for particles that can then be interrogated using light.

8. The optical waveguide of claim 7, wherein a lifting-gate valve has the topological shape of a ring, and is configured to physically enclose the particles, and wherein light is carried to or collected from the enclosed area by one or more waveguides.

9. The optical waveguide of claim 1, wherein the substrate comprises at least one of silicon, polydimethylsiloxane (PDMS), or glass; wherein the pneumatic layer comprises at least one of SiO2, SiN, or polydimethylsiloxane (PDMS); and wherein the optical waveguide is configured to actuate the micro-valve to function as one of an on-off switch (410), an optical signal splitter (412), a multi-mode interferometer (MMI, 430), and a physical trap (435) for particles that can then be interrogated using light.

10. A method for operating an optical waveguide (300), comprising:
injecting an optical signal into the optical waveguide, wherein the optical waveguide comprises a substrate (310) characterized by a first refractive index; a pneumatic layer (330) disposed on the substrate and characterized by a second refractive index; a channel (340) between the substrate and the pneumatic layer and configured to receive a sample fluid; a pneumatically actuated micro-valve (320) comprising a gate (320*a*) characterized by a third refractive index, wherein the third refractive index is greater than the first refractive index and the second refractive index; and an optical channel (450) configured to guide the optical signal between the substrate and the pneumatic layer transversely to the channel;
pneumatically actuating the micro-valve to switch from a state in which the gate is sufficiently withdrawn from the channel to permit fluid flow in the channel to a state in which the gate is positioned to block fluid flow in the channel; and
guiding the optical signal transversely through the channel when the gate is positioned to block fluid flow in the channel.

11. The method of claim 10, wherein the substrate comprises at least one of silicon, polydimethylsiloxane (PDMS), or glass.

12. The method of claim 10, wherein the pneumatic layer comprises at least one of SiO2, SiN, or polydimethylsiloxane (PDMS).

13. The method of claim 10, wherein the optical waveguide is configured to actuate the micro-valve to function as an on-off switch (410).

14. The method of claim 10, wherein the optical waveguide is configured to actuate the micro-valve to function as an optical signal splitter (412).

15. The method of claim 10, wherein the optical waveguide is configured to actuate the micro-valve to function as a multi-mode interferometer (MMI, 430).

16. The method of claim 10, wherein the optical waveguide is configured to function as a physical trap (435) for particles that can then be interrogated using light.

17. The method of claim 16, wherein a lifting-gate valve has the topological shape of a ring, and is configured to physically enclose the particles, and wherein light is carried to or collected from the enclosed area by one or more waveguides.

18. The method of claim 10, wherein the substrate comprises at least one of silicon, polydimethylsiloxane (PDMS), or glass; wherein the pneumatic layer comprises at least one of SiO2, SiN, or polydimethylsiloxane (PDMS); and wherein the optical waveguide is configured to actuate the micro-valve to function as one of an on-off switch (410), an optical signal splitter (412), a multi-mode interferometer (MMI, 430), and a physical trap (435) for particles that can then be interrogated using light.

\* \* \* \* \*